United States Patent [19]

Roman

[11] 4,033,523
[45] July 5, 1977

[54] FILM CARTRIDGE

[75] Inventor: Robert Justin Roman, Rochester, N.Y.

[73] Assignee: Eastman Kodak Company, Rochester, N.Y.

[22] Filed: Dec. 11, 1975

[21] Appl. No.: 639,950

[52] U.S. Cl. .................... 242/198; 242/71.1; 352/72
[51] Int. Cl.² ........................................ G03B 23/02
[58] Field of Search ............ 242/197, 198, 68.3, 242/71.8, 71.1; 206/403, 404, 405, 406, 387; 352/78 R, 72, 73, 74

[56] References Cited

UNITED STATES PATENTS

| 3,104,848 | 9/1963 | Joffe | 242/71.8 |
| 3,401,899 | 9/1968 | Goldberg | 242/198 |
| 3,467,339 | 9/1969 | Bradt | 242/197 |
| 3,865,238 | 2/1975 | Colaluca | 242/71.8 X |

Primary Examiner—George F. Mautz
Attorney, Agent, or Firm—J. Morrow

[57] ABSTRACT

A film cartridge for use with cinematographic apparatus or the like comprises a reel adapted to have flexible strip material wound thereon, a cover adapted to receive the reel in a nested position, and a releasable latch effective to retain the reel in the nested position until the cartridge is received by the cinematographic apparatus or the like. At that time, the latch is released by a portion of the apparatus.

8 Claims, 8 Drawing Figures

FILM CARTRIDGE

BACKGROUND OF THE INVENTION

1. Field of the Invention

This invention relates to a film cartridge for use with a motion picture projector or the like and more particularly, to an improved film cartridge comprising a reel and a mating cover adapted to receive the reel in a nested position within a cavity defined in the cover, the reel being releasably restrained in the nested position by a latch mechanism.

2. Description of The Prior Art

A film cartridge having a latching mechanism for restraining a casing body and a cover plate of a film cartridge is disclosed in U.S. Pat. No. 3,924,613 wherein the latching mechanism is actuable by a magnet to permit the cover plate to be separated from the casing body. One disadvantage of such a magnetically actuable latching mechanism is that the magnet used to release the cover could have a deleterious effect upon any magnetic sound track which recorded upon a film strip contained in the cartridge. The film cartridge of the present invention does not use such a magnetically actuable release. Instead, the reel and cover of the film cartridge are released by the latch mechanism whenever the cartridge is positoned onto a spindle of a motion picture projector or the like.

SUMMARY OF THE INVENTION

An improved film cartridge is realized as an object of the present invention. Preferably, the cartridge includes a latch assembly which releasably maintains film supporting means within a cavity of mating cover, the latch assembly being cooperable with a spindle of cinematographic apparatus or the like to release the film supporting means from the cover when the film cartridge is positioned thereon.

The present invention achieves as a further object an improved film cartridge adapted for storage of a film strip while permitting ready access to the film strip when the cartridge is placed upon a spindle of a motion picture projector or the like. In a preferred embodiment, the cartridge comprises film supporting means, a cover having a cavity defined therein for receiving the film supporting means, and latch means for releasably restraining the film supporting means in the storage position until cartridge is received by the spindle.

The invention and its objects and advantages will become more apparent in the detailed description of the preferred embodiment presented below.

BRIEF DESCRIPTION OF THE DRAWINGS

In the detailed description of the preferred embodiments presented below, reference is made to the accompanying drawings in which.

DESCRIPTION OF THE PREFERRED EMBODIMENT

Figure 1:
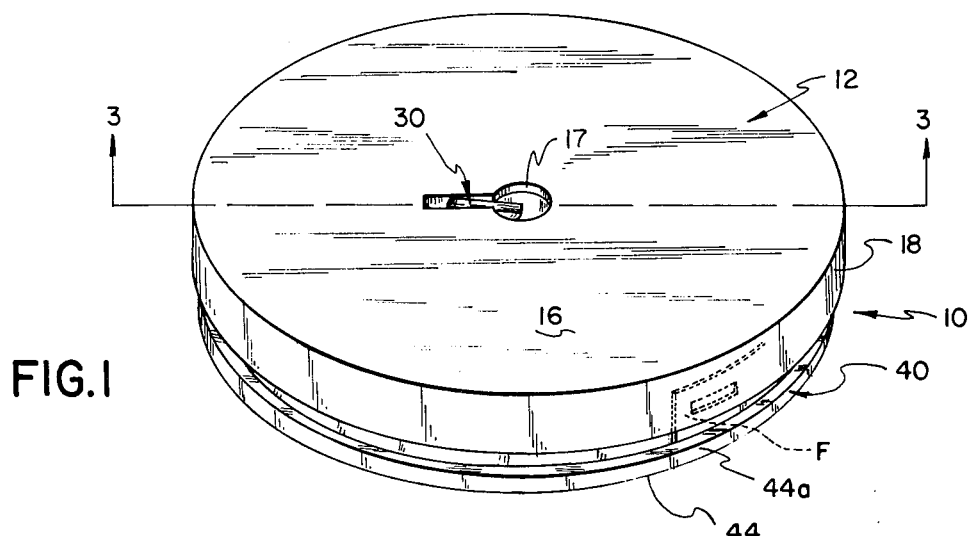
FIG. 1 is a perspective view of a preferred embodiment of a film cartridge according to the present invention.

Because motion picture film cartridges and related cinematographic apparatus are well known, the present description will be directed in particular to elements forming part of, or cooperating more directly with the present invention, apparatus not specifically shown or described herein being understood to be selectable from those known in the art.

In a preferred embodiment of the present invention, a film cartridge 10 comprises a cover 12 and a reel 40 which is adapted to be received into a generally cylindrical cavity 14 defined within the cover 12 by the lower surface 16a of the top 16 and an inner surface 18a of the peripheral edge 18. Preferably, cartridge 10 further includes a latching mechanism 30 which is suitable for releasably maintaining the reel 40 within the cavity 14 in a manner which will be later described.

Figure 2:
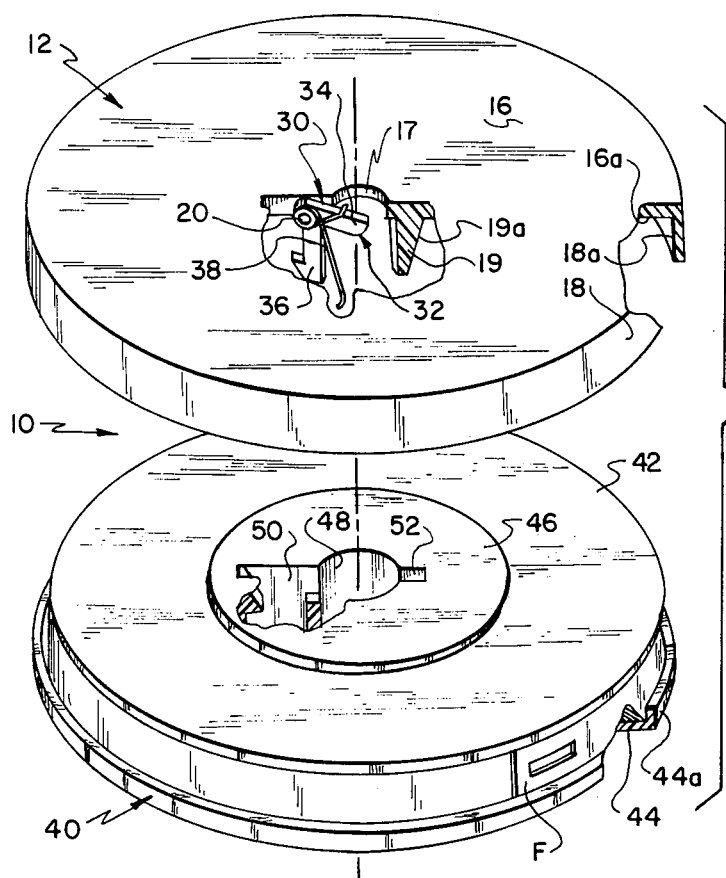
FIG. 2 is an exploded view of the film cartridge shown in FIG. 1 with portions of the cartridge broken away to better illustrate details of the invention.
Figure 3:
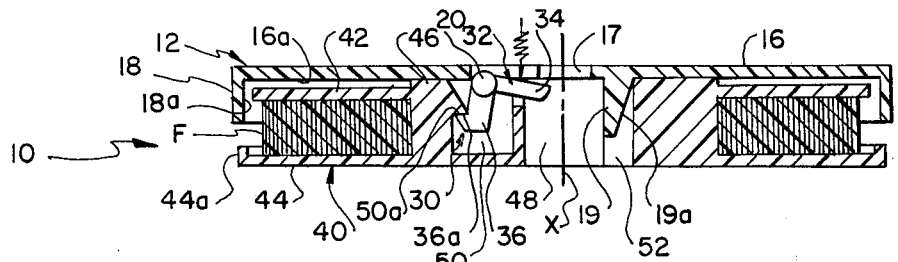
FIG. 3 is a cross-sectional view taken along line 3—3 of FIG. 1 showing the cover and reel portions of the cartridge in a nested position.

Referring now to FIG. 2, the cover 12 is shown spaced from the reel 40 and portions of the cover and reel are borken away to better illustrate details of the preferred embodiment of the present invention. As shown, reel 40 includes an upper flange 42 and a lower flange 44. Flanges 42 and 44 are maintained in a generally parallel plane separated by a distance determined by the width of the hub 46. Preferably, the lower flange 44 includes at the outer periphery a cylindrical portion 44a extending toward upper flanges 42. Lower flange 44 cooperates with the edge 18 of the cover 12 when the cover is received or nested into the cavity 14 to retrain a received strip of film F from clockspringing outward from the reel 40. This feature especially makes cartridge 10 suitable for storing the film F when reel 40 is nested in the cover 12 as shown in FIGS. 1 and 3.

As previously mentioned, the preferred embodiment of the present invention illustrated in the drawings includes a latch mechanism 30 which is suitable for releasably retaining the reel 40 within the cavity 14 of the cover 12. Latch mechanism 30 includes a generally "L-shaped" latch member 32 having a first or bearing arm 34 and a second or latch arm 36. Preferably, the latch member 32 is pivotally mounted, such as by a rivet 20 extending from a portion of the top 16 of the cartridge and passing through a central portion of the latch member 32. In this manner, bearing arm 34 of the latch member 32 is positionable in a "kay-hole" shaped opening 17 defined in the central portion of the top 16 and the latch arm 36 is positonable generally perpendicular to surface 16a as shown in FIG. 2.

In the preferred embodiment of the present invention, reel 40 includes a centrally defined opening 48 in the hub 46. Opening 48 is suitable for receiving the spindle 60 of a cinematographic apparatus or the like for supporting the reel 40 in a known manner. An irregularly-shaped opening 50 is located adjacent to the opening 48 for receiving and cooperating with the latch arm 36 of th latch manner 32. A rib or lip portion 50a is defined in the opening 50, the lip portion 50a being adapted to cooperate and catch portion 36a of the latch arm 36 for releasably latching the reel 40 and cover 12 in the nested position illustrated in FIGS. 1 and 3. In the preferred embodiment, a leg spring 38 cooperates with surface 16a and the latch arm 36 to urge the latch member 32 in a clockwise direction about the rivet 20 toward the position illustrated in FIG. 2. This arrangement maintains catch 36a of latch arm 36 in engagement with the lip portion 50a to releasably restrain the cover 12 and reel 40 in the nested position.

Figure 4:
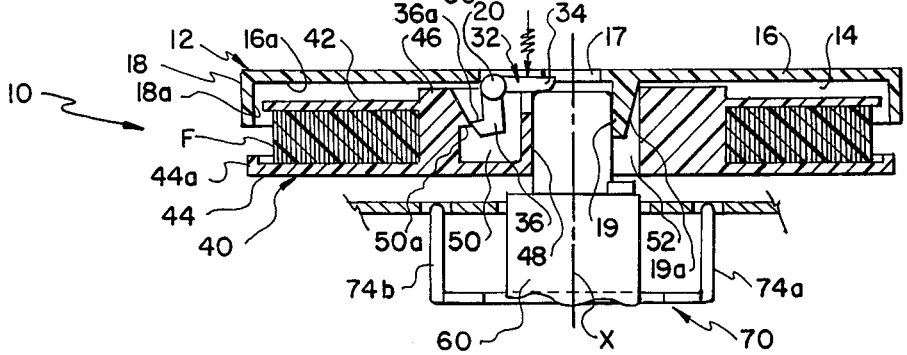
FIGS. 4, 5 and 6 are views similar to FIG. 3 illustrating a preferred embodiment of a releasable latch assembly as it cooperates with the cover and reel of the cartridge and with portions of a cinematographic apparatus which is adapted to receive the cartridge.
Figure 5:
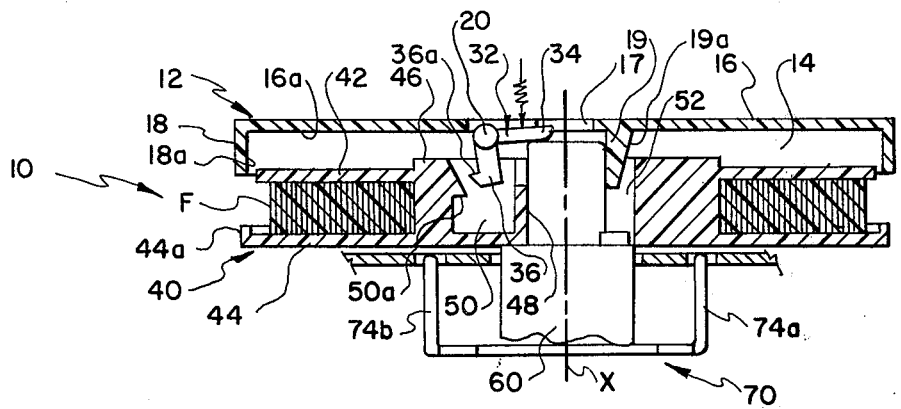
Figure 6:
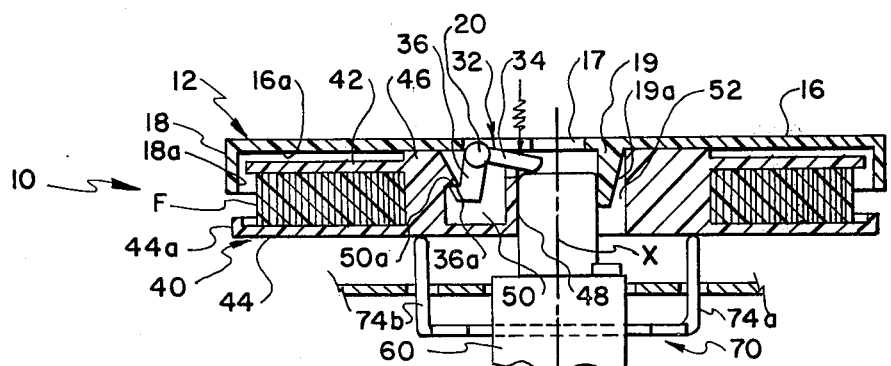

FIGS. 4 through 6 illustrate the cooperation between the cartridge 10 and spindle 60 of a cinematographic apparatus or the like as the spindle is received into the opening 48 in the hub 46. As illustrated in FIGS. 4 and 5, when the cartridge is loaded on the apparatus the spindle 60 cooperates with the bearing arm 34 of the latch member to unlatch the latch mechanism 30 by urging the latch member 32 in a counterclockwise direction about the rivet 20 against the urging of the leg spring 38. As this occurs, the latch 36a is released from the lip 50a, thereby permitting the reel to be moved by gravity from the nested position wherein the film F is contained by the reel and cover to a released or operative position illustrated in FIG. 5 wherein the film F can be wound onto the reel 40 or removed therefrom. When in the operative position, the film F is freely movable between the edge 16 of the cover 12 and a lip 44a on the lower flange 44 of the reel 40 to permit the film F to cooperate with the other known portions (not illustrated) of the cinematographic apparatus.

When the operator desires to remove the cartridge 10 from the spindle 60, the reel 40 may be lifted from the spindle by the operator manually grasping the lower flange 44 by its outer edges and lifting the reel 40 directly upward. As the reel 40 is lifted from the spindle 60, it is returned into and nested within the cavity 14 of the cover 12 and the leg spring 38 again urges the latch member 32 in a clockwise direction about the rivet 20 toward the latched position shown in FIG. 3 wherein the catch portion 36a of the latch again cooperates with the lip 50a and is therein effective to releasably maintain the reel 40 in the nested position.

Figure 8:
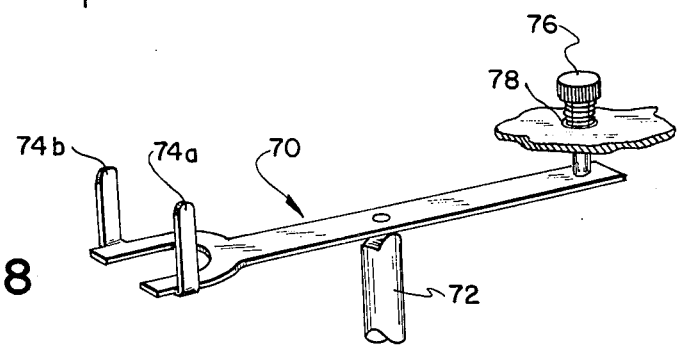
FIG. 8 illustrates a portion of the cinematographic apparatus suitable for returning the reel to the nested position and for removing the cartridge from the apparatus.

Although the cartridge 10 is readily removable from the spindle by the operator as previously described, the cinematographic apparatus may incorporate a release mechanism to simplify or even automate the removal of the cartridge 10 from the spindle 60. As shown in FIG. 8, one such release mechanism includes a bracket 70 which is pivotally mounted to the top of a shaft 72 extending upward from a portion (not shown) of the cinematographic apparatus. The first end of the bracket 70 is bifurcated and includes two upwardly extending projections 74a and 74b, which are positioned adjacent to opposed sides of the spindle 60. The opposite end of the bracket 70 is engageable by a depressible button 76 which is movable through an opening 78 in the housing of the cinematographic apparatus. When button 76 is depressed by the operator, the lower end of the button contracts the bracket 70 and pivots the bracket about the shaft 72. The pivotal movement of bracket 70 moves projections 74a and 74b through openings 70a and 70b, rspectively, as shown in FIG. 6, to contact the lower portion of the hub 46 or the lower flange 44 to lift the reel 40 from the spindle 60. When the reel 40 lifted by the release mechanism, the reel is again returned to the nested position with respect to the cover 12 wherein the reel 40 is again releasably maintained in the nested position by the latch mechanism 30 as previously described.

Although the cover 12 is freely movable between the nested (FIG. 1) position and the operative (FIG. 5) position, it has been found desirable to provide additional alignment means to insure proper alignment of cover 12 and the reel 40 as the cover 12 is moved relative to the reel 40. In the preferred embodiment, the alignment means comprises a projection 19 extending downward from the surface 16a of the top 16 of the cover 12 and is suitable for cooperating with an opening 52 defined in the hub 46 of the reel 40. Preferably, projection 19 includes a tapered surface 19a and is suitably shaped to align the cover 12 with the reel 40 as it is received into the opening 52 thereby assuring positive positioning of catch 36a with respect to the lip portion 50a when the cover 12 is returned to the nested position.

Figure 7:
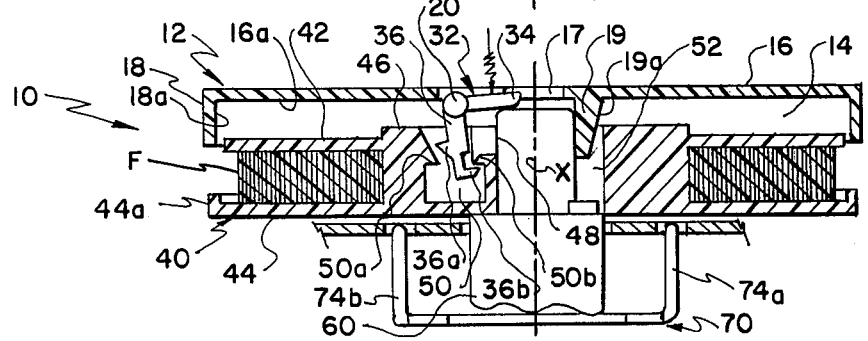
FIG. 7 depicts film cartridge similar to that shown in FIGS. 1 through 6 but including an alternative embodiment of the releasable latching mechanism.

In the embodiments of the present invention shown in FIGS. 2 through 6, the operator can remove the cover 12 from the spindle 60 if it is desired. In an alternative embodiment illustrated in FIG. 7, latch arm 36 is provided with an additional catch member 36b which is adapted to cooperate with another rib or lip 50b defined in the opening 50 to prevent removal of the cover 12 from the reel 40 if the removal feature is not considered to be desirable. It is understood that such a modification can be readily made in view of the teachings of the present invention and it is further understood that other variations and modifications can be effected within the spirit and scope of the invention.

I claim:

1. A film cartridge adapted to be received by a spindle, said cartridge including film supporting means adapted to have a film strip wound thereon and a cover having a cavity defined therein to receive the film supporting means in a nested position, the cartridge further comprising:

latch means including a member pivotally supported by said cover for cooperating with the spindle when the cartridge is mounted thereon, said member being movable by said spindle from (1) a first position wherein said member releasably maintains said film supporting means in said nested position toward (2) a second position wherein said film supporting means is released from said nested position.

2. A film cartridge as set forth in claim 1 wherein said latch means further comprises resilient means for urging said member toward said first position from said second position.

3. A film cartridge adapted to be received by the spindle of a cinematographic apparatus or the like, said cartridge comprising:

a. film supporting means adapted to have a film strip wound thereon, said film supporting means comprising (1) a hub having an opening defined therein for receiving said spindle and (2) first and second flanges supported by said hub at a spaced distance to permit a film strip to be maintained therebetween;

b. cover means adapted to receive said film supporting means and to be movable to and from a nested position wherein said cover means is effective at least partially cover a film strip wound on said film supporting means; and c. a latch member having first and second arms, said latch member being pivotally supported by said cover means in a position wherein said first arm is positioned to cooperate with the spindle and said second arm is positioned to cooperate with the hub of said film supporting means in the nested position, said latch member being movable responsive to the spindle to release said film supporting means when said cartridge is received by the spindle.

4. A film cartridge as set forth in claim 3 further comprising a resilient member for urging said latch member toward a position wherein said second arm engages said film supporting means for releasably maintaining said film supporting means in the nested position.

5. A cartridge adapted to be received by a spindle of a motion picture projector or the like, said cartridge comprising:
   a. a reel;
   b. a cover having a cavity defined therein, said cavity being adapted to receive said reel in a nested position wherein said reel is at least partially surrounded by said cover;
   c. a latch member pivotally supported by said cover and engageable with a portion of the reel for releasably retaining the reel in its nested position in the cavity said latch member being adapted to cooperate with the spindle when said cartridge is received by said spindle to change said latch member from (1) a latched condition wherein said latch member engages and maintains said reel in said nested position toward (2) an unlatched condition wherein said latch member permits said reel to be removed from said cavity; and
   d. resilient means adapted move said latch member from its unlatched condition toward its latched condition.

6. A cartridge adapted to be received by the spindle of web handling apparatus or the like, said cartridge comprising:
   a. a reel including (1) a hub having an opening defined therein for receiving the spindle and (2) first and second flanges supported by said hub at a spaced distance such that web may be freely wound onto or removed from said hub between said flanges;
   b. a cover having a cavity defined therein to receive said reel in a nested position wherein said cover at least partially surrounds a web wound onto said hub to prevent said web from being freely unwound from said hub;
   c. a latch member having first and second arms, said latch member being pivotally supported by said cover for pivotal movement between (1) a first position wherein said first arm releasably engages said reel and maintains said reel in the nested position and wherein said second arm is positioned in said opening in said hub such that it is displaceable by said spindle to release said first arm from engagement with said reel and (2) a second position wherein said second arm is displaced by said spindle releasing said first arm from engagement with said reel and permitting said reel to be removed from said nested position.

7. A cartridge as set forth claim 6 further comprising a resilient member urging said latch member toward its first position.

8. A cartridge for use with web handling apparatus or the like having a spindle, said cartridge comprising:
   a. A reel including (1) a hub having an opening defined therein in an axial direction for receiving the spindle and (2) a pair of parallel flanges affixed to said hub at a spaced distance such that a web may be freely wound onto or removed from said hub between said flanges;
   b. a cover having a cavity defined therein adapted to at least partially receive said reel in a nested position when said cartridge is removed from said spindle to prevent a web wound onto said hub from being freely unwound therefrom;
   c. latch means including a latch member pivotally supported by said cover for pivotal movement responsive to said spindle from (1) a first position wherein said member engages said reel and releasably retains said reel in said nested position toward (2) a second position wherein said member is released from engagement with said reel and said cover is movable in an axial direction with respect to said reel to remove said reel from said nested position.

* * * * *